Feb. 23, 1943.  R. STORTZ  2,312,274
CONTROL DEVICE
Filed Aug. 9, 1940
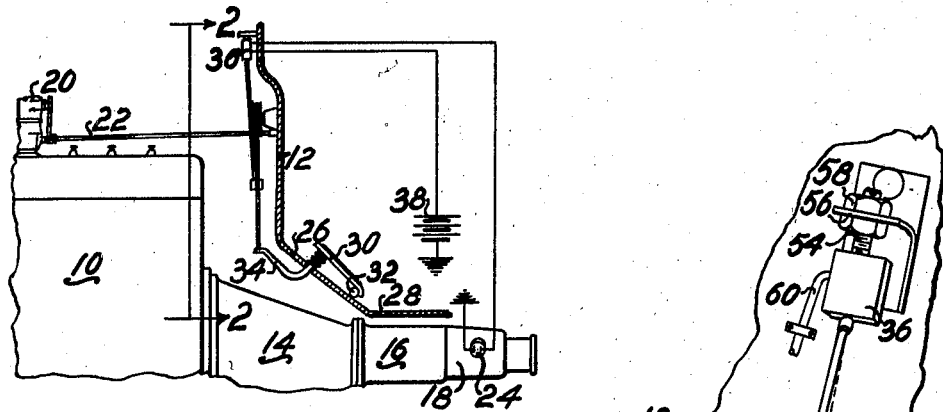
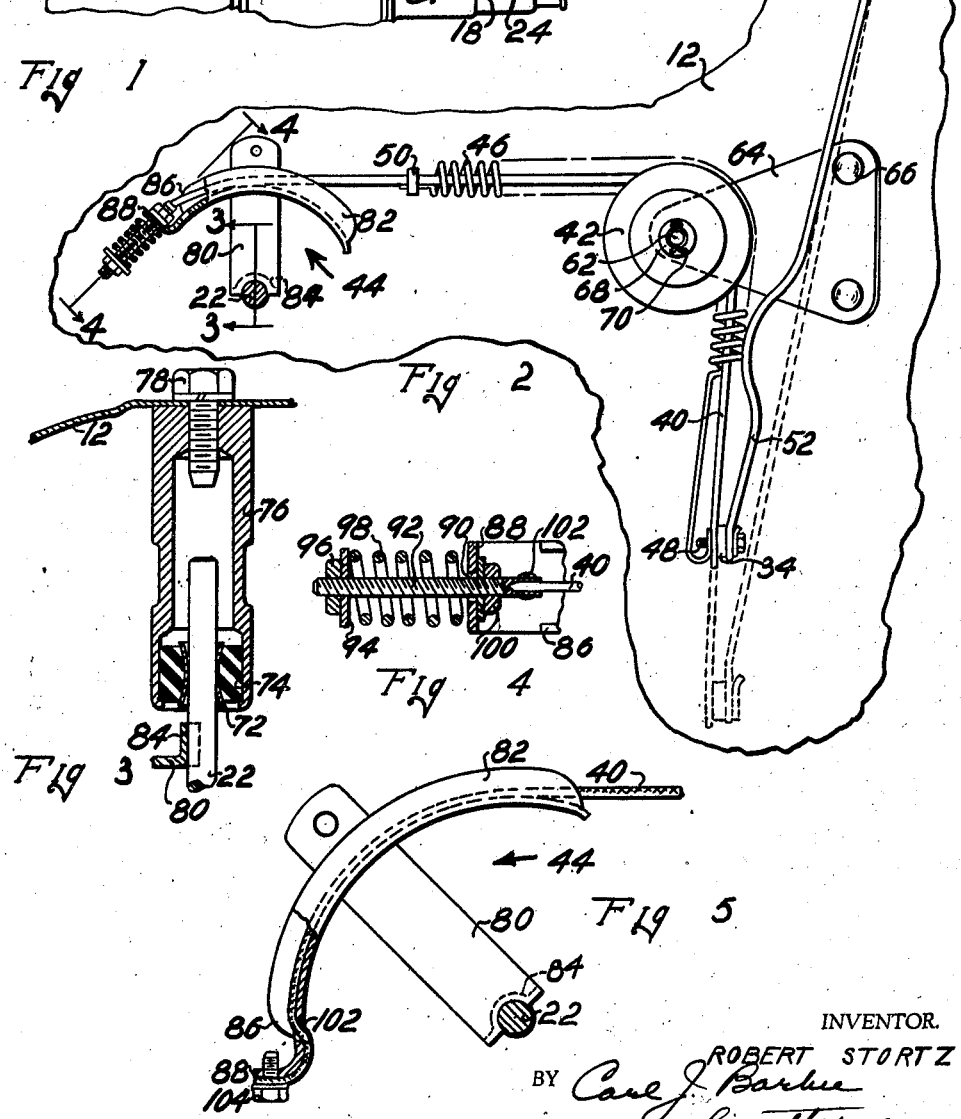
INVENTOR.
ROBERT STORTZ Patented Feb. 23, 1943

2,312,274

UNITED STATES PATENT OFFICE 2,312,274

CONTROL DEVICE

Robert Stortz, Racine County, Wis., assignor to Nash-Kelvinator Corporation, Kenosha, Wis., a corporation of Maryland Application August 9, 1940, Serial No. 351,928

9 Claims. (Cl. 74—478)

This invention relates to control devices and has particular reference to a control for operating an over-drive unit from a throttle control of an automobile.

It is an object of this invention to provide mechanism by means of which an over-drive unit may be shifted by movement of an accelerator control.

It is another object of this invention to provide a control for shifting an over-drive unit by means of a cable which is connected to move a throttle, without affecting the over-drive unit during normal operation of the throttle.

It is another object of this invention to provide a control for a throttle which may be used in automobiles constructed with or without an over-drive unit.

Other objects and advantages of this invention will be apparent from a consideration of the following description and claims and the attached drawings of which there is one sheet and in which:

Figure 1 represents a vertical, longitudinal, sectional view through the motor compartment and dash panel of an automobile;

Figure 2 represents a sectional view taken along a plane indicated by the line 2—2 in Figure 1 and looking in the direction of the arrows;

Figure 3 represents a sectional view taken along a plane indicated by the line 3—3 in Figure 2 and looking in the direction of the arrows;

Figure 4 represents a sectional view taken along a plane indicated by the line 4—4 in Figure 2 and looking in the direction of the arrows;

Figure 5 represents a modified method of connecting a portion of the structure illustrated in Figure 2.

Some present day automobiles are constructed with what is known as an over-drive unit connected behind the regular transmission and ahead of the drive shaft. These over-drive units are well known and consist of gearing by means of which the driving ratio to the rear wheels may be changed so as to slow down the motor speed relative to the speed of the driving wheels. These over-drive units are arranged to operate automatically after the automobile has obtained a pre-determined speed. In operating an automobile equipped with an over-drive it often becomes desirable, particularly in passing or overtaking another automobile, to disengage the over-drive unit to obtain a lower drive ratio with the consequent high torque and ability to accelerate the automobile. To accomplish this, over-drive units are commonly provided with shifting mechanism operated by an electrical solenoid. The solenoid is connected through a switch to a power source such as the battery of the automobile, and the switch is mechanically connected to the accelerator pedal so that the switch may be operated by movement of the accelerator pedal to disconnect the over-drive unit and place the automobile in direct drive. This invention deals with means for making the connection between the accelerator pedal and the switch which operates the solenoid.

Illustrated in Figure 1 is a portion of an automobile having an engine 10 and a front body panel or dash 12. The engine 10 has associated therewith a clutch 14, transmission 16 and an over-drive unit 18. Engine 10 is also provided with a carburetor 20 which has the usual throttle operated by rotation of a rod 22. Mounted on the over-drive unit 18 is a solenoid 24 which is arranged to disconnect the over-drive unit leaving the car in direct drive from the transmission 16.

The dash panel 12 is connected to a toe board 26 and the floor panel 28. Mounted on the toe board 26 is an accelerator pedal 30 which is pivoted at 32 and provided with an arm 34 which passes through the toe board and extends forwardly into the motor compartment. Mounted near the top of the dash panel 12 is an electric switch 36 from which suitable wiring (see Figure 1) extends to the battery 38 and to the solenoid 24. By closing the switch 36 a circuit is completed from the ground side of the solenoid through the solenoid, switch and battery, to the grounded side of the battery to operate the solenoid.

The arm 34 on the accelerator pedal 30 is connected to the throttle shaft 22 by means of a cable 40 which passes over a pulley 42 to a bracket generally indicated at 44, which is secured to the throttle shaft 22. A coil spring 46 is positioned around the cable 40 where the cable passes around the pulley 42 so as to prevent the cable from jamming in the pulley. One end of the coil spring is secured to the arm 34 by the screw 48 which secures the cable to the arm, and the other end of the coil spring is secured to the cable 40 by a suitable clip 50.

The screw 48 also secures the lower end of the cable 52 to the end of the arm 34. Cable 52 is connected to the switch 36 and is arranged to operate the switch by pulling down on the cable.

The switch 36 is supported from the dash panel 12 by a bolt 54 which passes through the bracket 56 riveted, or otherwise suitably secured to the dash panel. Nuts 58 threaded on the bolt 54 secure the bolt to the bracket. The switch 36 is provided with a cable 60 (see Figure 2) through which extend the wires illustrated diagrammatically in Figure 1.

The pulley 42 is rotatively supported on a shaft 62 which is supported by a generally triangular shaped bracket 64 secured to the dash panel 12 by the rivets 66. Pulley 42 is secured on the shaft 62 by a washer 68 and cotter pin 70.

The rear end of the throttle shaft 22 is journaled in a flared bushing 72 (see Figure 3), which bushing is supported in a cylindrical rubber grommet 74 positioned within the open end of a tubular member 76. The tubular member 76 is secured to the dash panel 12 by a cap screw 78 passed through the panel and threaded into the end of the tube 76.

The bracket 44 consists of an arm 80 and an arcuate rim 82. The arcuate rim 82 is channel-shaped in cross section and is suitably secured as by welding to the outer end of the arm 80. The flanges of the rim 82 are cut off at 86, and the webbed portion of the rim is bent upwardly to form a stop 88. The bent stop 88 of the rim 82 is apertured as at 90 so as to freely pass a threaded bolt 92. One end of the bolt 92 is hollow and has secured therein, as by clamping or welding, the end of the accelerator cable 40. Positioned on the other end of the bolt 92 is a washer 94 and a nut 96. Retained between the washer 94 and the stop 88 of the rim 82 is a coil spring 98. The spring 98 is initially compressed by turning a nut 100 threaded on the end of the bolt 92 near the cable 40.

The spring 98 is compressed by turning down the nut 100 until it is stiff enough so that tension in the cable 40 acting through the bolt 92, nut 96, washer 94, spring 98 and stop 88 will rotate the bracket 44 and the throttle shaft 22. When the throttle shaft 22 has completely opened the throttle in the carburetor 20, the further movement of the throttle and throttle shaft 22 will be stopped by reason of the throttle mechanism striking its open limit stop. However, increased tension in the cable 40 will draw the bolt 92 through the aperture 90 against the compression of the coil spring 98. In this manner accelerator pedal 30 and its arm 34 may be pressed downwardly after the throttle of the carburetor 20 is wide open. The cable 52 which operates the switch 36 is long enough so that it will not operate the switch 36 until after the throttle is wide open, and the cable 40 and arm 34 have been moved through the last movement as indicated by the dotted lines in Figure 2.

It should thus be evident that the automobile may be operated at full throttle in over-drive without actuating the switch 36 to disconnect the over-drive. The throttle control is positive at all speeds. However, should the operator desire to disconnect the over-drive he has only to press the accelerator pedal completely down past the open position of the throttle so as to operate the switch 36 as has been explained above.

The web portion of the rim 82 is provided with an aperture 102 near the stop 88 so that the end of the cable 40 may be passed through the under side of the rim and secured to the stop 88 by a screw 104 threaded into the aperture 90 (see Fig. 5). In this manner the bracket 44 may be used interchangeably in cars with and without over-drive units.

While I have described my invention in some detail, I intend this description to be an example only and not as a limitation of my invention to which I make the following claims:

1. A throttle shaft, an arm secured to said shaft, an arcuate rim secured to said arm radially of said shaft, and a portion of said rim bent into a flange extending radially across said rim, said flange defining an aperture, said rim defining a second aperture adjacent to said flange.

2. A throttle shaft, an arm secured to said shaft, an arcuate rim secured to said arm radially of said shaft, and a portion of said rim bent into a flange extending radially across said rim, said flange defining an aperture, a bolt extending through said aperture, a cable connected to one end of said bolt, a washer positioned on the other end of said bolt, and a coil spring positioned between said washer and said flange.

3. A throttle control comprising, a throttle shaft, an arm secured to said shaft and extending radially therefrom, an arcuate rim secured to said arm, said rim being channel-shaped in cross section, the end of said channel-shaped arcuate rim being bent radially outward and defining an aperture, the web of said rim defining a second aperture adjacent to said bent out portion.

4. In a combined throttle and accessory control, an accelerator pedal, an accelerator cable secured to said pedal, a cable for operating an accessory switch secured to said pedal, a throttle shaft, an arcuate member secured to said shaft, said accelerator cable being passed freely through a portion of said arcuate member, and a coil spring positioned between the end of said throttle cable and said last mentioned portion of said arcuate member.

5. In a combined throttle and accessory control, an accelerator cable, an arcuate member arranged to operate a throttle, a radial flange formed on said arcuate member and defining an aperture, a threaded bolt passed freely through said aperture tangentially of said arcuate member, nuts on said threaded member, a coil spring positioned between one of said nuts and said radial flange, said threaded bolt being connected to said throttle cable, and an accessory switch arranged to be operated by said accelerator cable after said cable has been moved to completely open the throttle.

6. In an automobile having a throttle and an accessory, a shaft for operating said throttle, an arcuate bracket secured to said shaft and having a stop thereon, a spring, a cable connected through said spring to said stop, pulley means for guiding said cable to a point remote from said throttle shaft, an accelerator pedal connected to said cable, and a second cable connected to said accelerator pedal for operating said accessory.

7. In an automobile having a throttle and an accessory, a shaft for operating said throttle, an arcuate bracket secured to said shaft and having a stop thereon, a spring, a cable connected through said spring to said stop, pulley means for guiding said cable to a point remote from said throttle shaft, an accelerator pedal connected to said cable, and a second cable connected to said accelerator pedal for operating said accessory, said second cable being slack until after said accelerator is moved to complete throttle opening position.

8. In an automobile, a part to be controlled, a lever on said part arranged to control the part and defining an aperture, a control cable having a threaded end portion passed through said aperture, stop means secured to the end of said threaded portion, a coil spring positioned between said stop means and said lever, and means carried on said threaded end portion for preloading said spring.

9. In a combined throttle and accessory control, an accelerator cable, an arcuate member arranged to operate a throttle, a stop positioned on said arcuate member and defining an aperture, connecting means extending through said aperture tangentially of said arcuate member and secured to one end of said cable, a pair of other stop means adjustably positioned on said connecting means and on opposite sides of said first mentioned stop means, spring means positioned between said first mentioned stop means and one of said other stop means, an accessory operating switch, an accelerator pedal connected to said cable and arranged to rotate said arcuate member thereby, and a second cable arranged to operate said switch and connected to said accelerator pedal, said other cable being of such a length as to be slack until said first cable has compressed said spring means.

ROBERT STORTZ.